United States Patent [19]

Gingrich

[11] Patent Number: 5,327,852
[45] Date of Patent: Jul. 12, 1994

[54] ANIMAL PHOTO STUDIO

[76] Inventor: Jerry L. Gingrich, 25120 Marion Ave., Punta Gorda, Fla. 33950

[21] Appl. No.: 106,586

[22] Filed: Aug. 16, 1993

[51] Int. Cl.$^5$ ............................................. A01K 1/03
[52] U.S. Cl. ...................................................... 119/19
[58] Field of Search .................. 119/15, 17, 19, 21; 220/662, 663, 676, 611; 40/160

[56] References Cited

U.S. PATENT DOCUMENTS

| | | | |
|---|---|---|---|
| 1,553,544 | 9/1925 | Linneman | 119/19 |
| 2,522,391 | 9/1950 | McGonigle | 119/17 |
| 3,397,676 | 8/1968 | Barney | 119/15 |
| 4,177,761 | 11/1979 | Bellocchi, Jr. | 119/19 |
| 4,552,093 | 11/1985 | Puckett | 119/17 |
| 4,844,016 | 7/1989 | Filosa | 119/19 |
| 4,924,810 | 5/1990 | Tominaga | 119/15 |

Primary Examiner—Thomas Price
Attorney, Agent, or Firm—Frank A. Lukasik

[57] ABSTRACT

An animal cage for safely transporting and photographing animals is constructed with a circular base made from a commercially available black, plastic, bucket. Top access for observation or photography is obtained by an assembly of wooden blocks shaped to fit within a plastic ring at the top of the bucket. A frame is provided on the top with a square, glass pane sliding in grooves formed in the frame. Side access for observation or photography is obtained by cutting out a rectangular section of the bucket and fastening a side wooden frame having a glass pane sliding horizontally.

5 Claims, 3 Drawing Sheets

ANIMAL PHOTO STUDIO

BACKGROUND OF THE INVENTION

1. Field of the invention

The present invention relates to a container or a cage used for observing and photographing animals.

2. Description of the prior art

Various animal houses are already known, such as houses which may be referred to as cages, accommodation for animals, hatches, enclosures, or preconstructed fencing. Apart from a bird cage, in which a frame made of wire netting or latticed material of predetermined shape and predetermined inside cross section, which may be polygonal, circular, or oval is joined to floor boarding. One such animal cage is shown in U.S. Pat. No. 3,916,836 to Justl which discloses a method and apparatus for erecting or building an housing or containing small animals or birds by means of wall sections and a roof section, at least two wall parts being without frames and of rectangular contour, and two parallel front ends shaped in the form of a curve, are placed with one curved front end on the ground and detachably fixed in the desired operating position relative to the ground with parallel, straight edges which substantially touch one another, and the wall sections along these straight edges being detachably fixed to each other, forming a tube, and at least one hood shaped cover part being placed on this tube.

U.S. Pat. No. 4,924,810 to Tominga discloses an insect keeping and observing container comprising a round recessed part in the center of a removable lid of a main transparent container and a round plate at the bottom of the recessed part which can be removed by cutting joint pieces at the annular edge outside the round plate. The insect keeping and observing container can be connected to tubular members which serve as a tunnel to a rodent's breeding housing by removing the round plate.

U.S. Pat. No. 4,969,417 to Sakano discloses a cage for experimental animals comprising a body, a position detection part to be assembled with the body and a cover for covering the body. The body has a cylindrical cover projected from a bottom, and a keeping space defined between a side wall of the body and the cylindrical cover for keeping experimental animals. The position detection part has a detector at the circumferential surface for detecting the behavioral movement of the animal.

Each of the prior art devices disclose animal cages for temporary storage or study of animal behavior. Tominaga is rectangular and cannot provide clear access for cameras. Justl merely provides a round structure. Sakano discusses the prior art disadvantages of rectangular cages for the observation of animals.

SUMMARY OF THE INVENTION

It is therefore an object of the present invention to provide a cage for animals capable of accurately observing the behavior and photographing the animals.

It is a further object of the invention to provide a cage for animals capable of being observed and photographed at close range.

A still further object of the invention is to provide a container whose opening parts are designed to obviate any possibility of captured animals escaping.

In order to attain these objects, the present invention relates to an animal cage for safely transporting and photographing animals. The animal cage is constructed with a circular base made from a commercially available black, plastic, bucket. Top access for observation or photography is obtained by an assembly of wooden blocks shaped to fit within a plastic ring at the top of the bucket. A frame is provided on the top with a square, glass pane sliding in grooves formed in the frame. Side access for observation or photography is obtained by cutting out a rectangular section of the bucket and fastening a side wooden frame having a glass pane sliding horizontally.

DESCRIPTION OF THE PREFERRED EMBODIMENT

Figure 1:
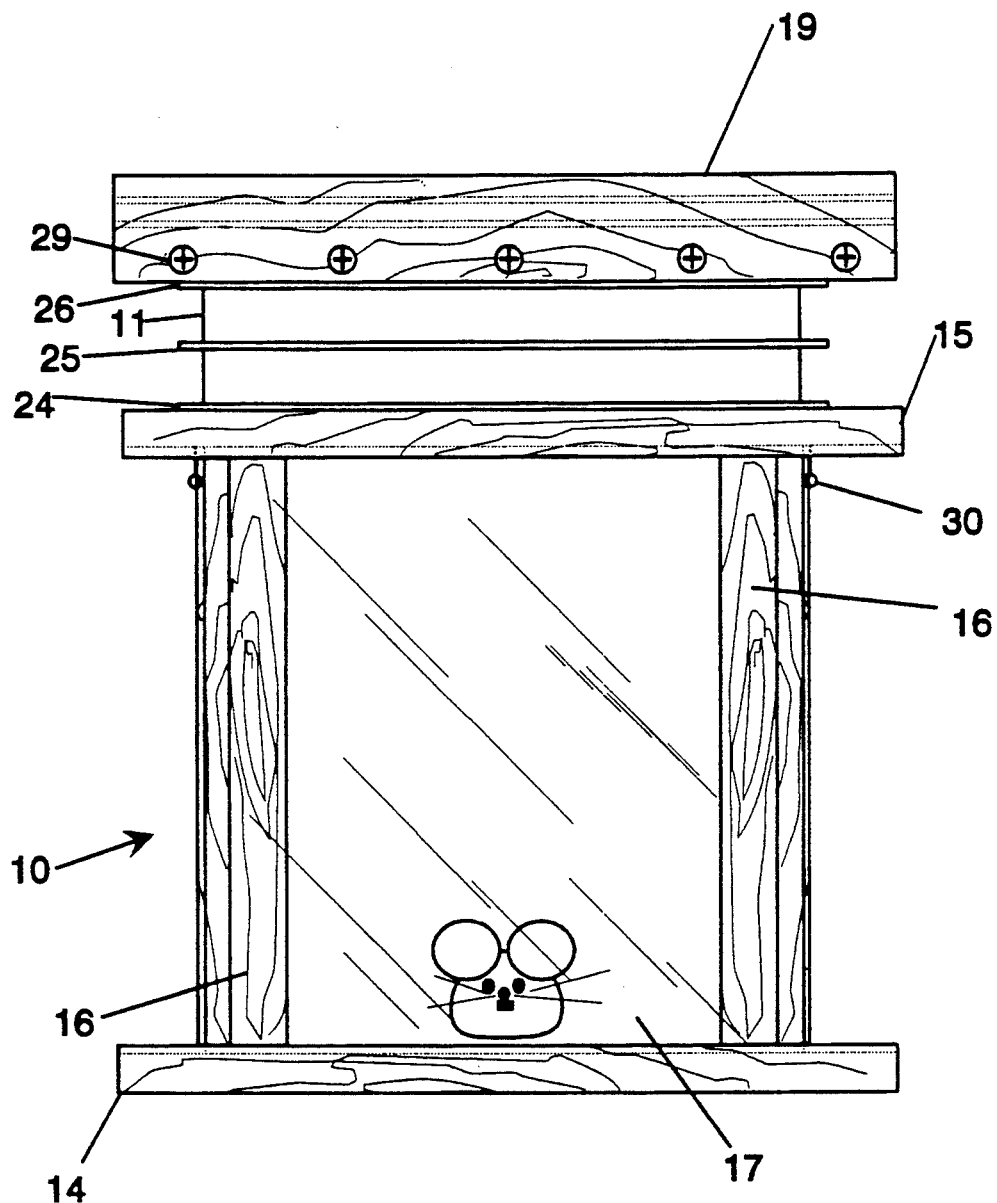
FIG. 1 is a front view of the animal photo studio according to the present invention.
Figure 2:
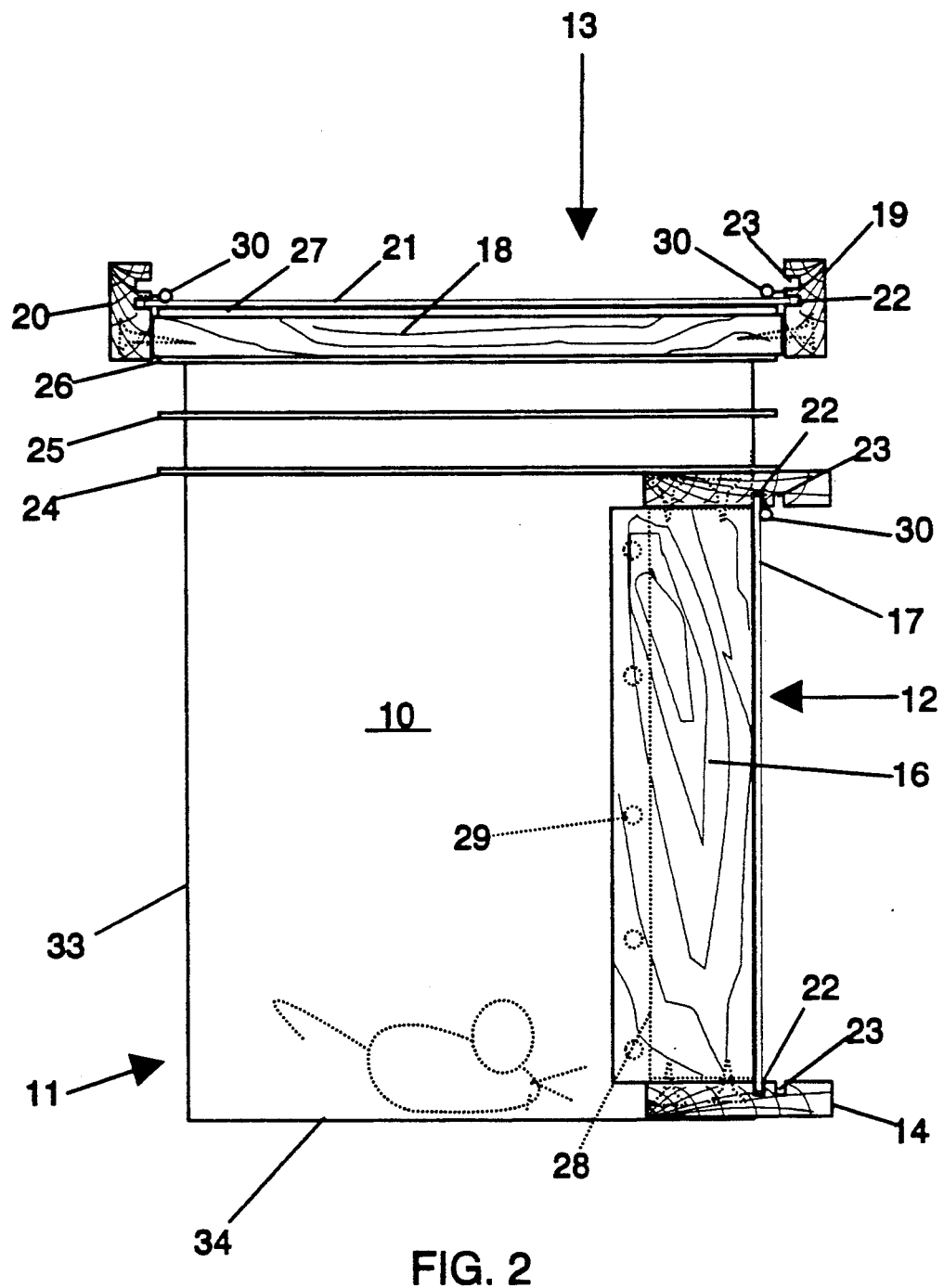
FIG. 2 is a side view of the animal photo studio according to the present invention.
Figure 3:
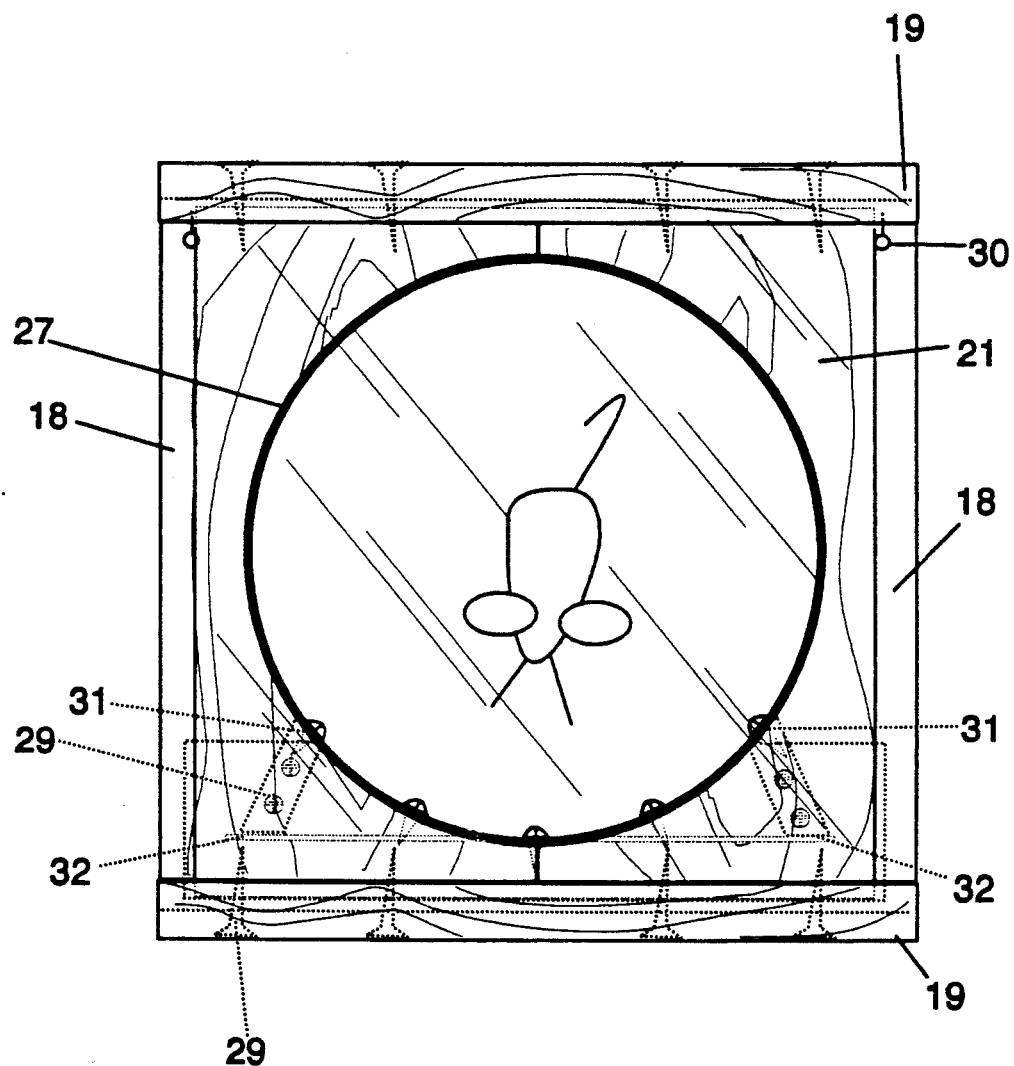
FIG. 3 is a top view of the animal photo studio according to the present invention.

As shown in FIGS. 1-3, an animal photo studio or observing container 10 consists of a base 11, a front frame assembly 12, and a top frame assembly 13. The base 11 is preferably a standard, commercially available plastic container. The base 11, as shown, is a convenient, five gallon pail, which may be purchased in most hardware or home supply stores. The container of the invention has been made from a base unit as large as a 59 gallon container. I have found that a round, black, container, base 11, is the most suited for photographing animals. If a rectangular container is used, the natural tendency of an animal would be to seek shelter in a corner and thus would not be a good subject for photo taking. Furthermore, a round, black, background will not reflect light back at the camera. In considering the design of the base 11 it was important to seek alternatives to keep the cost of manufacture as low as possible. Since plastic appeared to be the most suitable material to use because of its strength, durability and cost, it was decided to seek an off-the-shelf unit. The cost of plastic molds and dies discourages custom creations.

The design selected, e.g., the five gallon pail, is ideal for photographing small animals. Peripheral protrusions 24 25 and 26, and top 27 provide rigidity at the top of base 11. The protrusion 26 and top 27 are used to retain top frame assembly 13 in a rotatable position on base 11.

The front frame assembly 12 is fastened to vertical side 33 of base 11 after a rectangular opening 28 (shown in dotted lines) is cut into the side of base 11. The bottom of opening 28 is approximately one inch above the bottom of base 11, and up to the top face of lower front guide 14. The bottom of front guide 14, then becomes level with the bottom of base 11 and touches the surface upon which the unit is placed to provide additional stability for the studio 10. Opening 28 is generally about one third of the circumference of the base 11. Such a large cutout would generally weaken the base 11, however, the rigidity provided by the front frame assembly 12 more than compensates for the cutout. Front frame assembly 12 comprises the lower front guide 14, upper front guide 15 and vertical supports 16. The upper and lower front guides 14 and 15 are identical as well as the vertical supports 16 for economy of manufacture as well as efficiency of assembly.

Upper and lower front guides 14 and 15 each contain an inner groove 22 and an outer groove 23. Vertical supports 16 are cut at an angle of 45° at the edge 31 affixed to base 11 and at 15° at the open edge 32. Upper and lower front guides 14 and 15 are fastened with wood screws 29 to vertical supports 16 to form the front frame assembly 12 which is then fastened with screws 29 and/or glued to base 11. After the assembly 12 is fastened to base 11, front glass slide 17 is inserted into inner groove 22 and the front frame assembly 12 is complete. Having the vertical supports 16 angled outwardly provides a larger opening for close-up viewing, or camera work, and provides access to the entire interior of the base 11.

Top frame assembly 13 comprises two top frame base clamps 18, each having an inner edge cut out in a semi circle with a radius equal to the radius of the top of base 11, and rotatably engaging base 11 between protrusion 26 and top 27. Top horizontal guides 19 and 20 are fastened with screws 29 to the edges of horizontal guides 19 and 20 thus completing the assembly of top frame 13. Top glass slide 21 is then inserted into the inner groove 22.

Front frame assembly 12 and top frame assembly 13 are preferably made from unfinished pine although other woods or plastic may also be used. It is also preferred to stain the assemblies with a dark color such as black to reduce reflections. The inner grooves 22 and outer grooves 23 are provided for several reasons. Normally, glass slides 17 and 21 are kept in the inner grooves 22. In addition, pegboard slides (not shown), cut to the same dimensions as the glass, may also be used to provide ventilation for the animal, especially if the animal will be kept for a longer period of time. The ventilation pegboard may be inserted in the outer groove 23 and the glass slides may then be safely removed without fear of the animal escaping. This is especially important when the animal subject is a dangerous reptile or wild animal.

The front glass slide 17 is the most used part of the studio 10 and is especially suitable for this use. In the first place, the glass must be at least ¼inch thick which is required to cage poisonous snakes. Secondly, the slide 17 is made square to ensure a quick fit when inserting the glass slide 17. For example, if an animal subject is placed in the studio 10 and the front slide 17 is closed, natural animal behavior prompts the animal to establish its territorial rights by urinating or defecating on the glass slide 17. With some animals, the glass may be removed for photographing the subject. However, if the glass slide 17 is indispensable, as in the case of a poisonous or venomous animal, a second glass slide 17 may be inserted into the outer groove 23, the inner glass slide 17 removed, and re-inserted after cleaning.

The rotatable top frame assembly 13 provides a convenient means for removing or replacing the top glass slide 21 since rotating the frame assembly 13 provides the option of removing the slide 21 by pulling it out towards the side, or the front, or in back of the unit. To provide additional illumination, a flash unit may be held overhead and used with the glass slide 21 in place or removed if the animal behavior permits the use of an open top cage. The black interior eliminates reflection and shadows. Various props or sets may be easily placed inside the studio 10 for creating a more natural setting for the photograph. Usually after a short period of adjustment the animal settles down in its new environment and the front glass slide 17 may be removed for close-up photography. With the wide angle front opening, a photographer has ready access to the entire interior of the studio 10.

Stops 30, shown as screw eyes, may be used to lock the glass slides in place. Other devices, such as locks or bolts, may also be used. I have found that a bungee cord wrapped around the base and over the front glass slide 17 is also effective. A similar bungee cord wrapped over the top frame assembly 13 and top glass slide 21 will also secure the top glass slide 17 for safe travel.

It should be understood that the foregoing relates only to a disclosed embodiment of the present invention, and that numerous changes or modifications may be made therein without departing from the spirit or the scope of the invention as defined in the following claims.

I claim:

1. An animal cage for safely transporting and photographing animals comprising:
   a circular, black, base, having a top, a vertical side, and a bottom, said side having a plurality of protrusions formed thereon near said top, and a rectangular cutout section formed in said side,
   a front frame assembly affixed to said base and enclosing said rectangular cutout section, said assembly having a horizontally sliding glass pane for slidably sealing said cutout section, and
   a top frame assembly rotatably mounted on said base between said top and one of said plurality of protrusions, said top frame assembly having a horizontally sliding glass pane for slidably sealing said top.

2. An animal cage as defined in claim 1, wherein said front frame assembly and said top frame assembly each comprise a pair of horizontal frame members, each having two sliding grooves for mounting said glass panes.

3. An animal cage as defined in claim 1, wherein said top frame assembly comprises two top frame base clamps each having an inner edge cut out in a semi circle and rotatably engaging said base between two of said protrusions, and horizontal guides having two sliding grooves, said horizontal guides fastened to and holding said base clamps together and providing a guide track for said sliding glass pane.

4. An animal cage as defined in claim 1, wherein said front frame assembly comprises vertical supports cut at an angle of 45° at a first edge for engaging said base and cut at an angle of 15° at a second edge engaging said sliding glass pane whereby a larger opening is provided for close-up viewing and camera work.

5. An animal cage for safely transporting and photographing animals comprising:
   a circular, black, base, having a top, a vertical side surface, and a bottom, said side surface having a plurality of protrusions located near said top and at said top, and having a rectangular cutout section formed in said side surface beginning below said protrusions and ending slightly above said bottom, said cutout section comprising about one third of said side surface,
   a front frame assembly having vertical supports and horizontal guides forming said assembly and affixed to said base and enclosing said cutout section, said vertical supports cut at an angle of 45° at a first inner edge for engaging said base at a wide angle, said vertical supports cut at an angle of 15° at a second outer edge, said horizontal guides each having two sliding grooves cut therein, and a glass pane slidably engaging said grooves and sealingly engaged with said second outer edge, and a top frame assembly comprising two top frame base clamps each having an inner edge cut out in a semi circle and rotatably engaging said base between the top of said base and one of said protrusions, two horizontal guides having two sliding grooves, said horizontal guides fastened to and holding said base clamps together and having two guide tracks in each of said horizontal guides and a glass pane slidably mounted in said guide tracks for slidably sealing said top of said base.

* * * * *

UNITED STATES PATENT AND TRADEMARK OFFICE
CERTIFICATE OF CORRECTION

PATENT NO. : 5,327,852
DATED : July 12, 1994
INVENTOR(S) : Jerry L. Gingrich

It is certified that error appears in the above-indentified patent and that said Letters Patent is hereby corrected as shown below:

On The Title Page Item [76] Inventor:

Change the spelling of the Inventor's name from "Gingrich" to --Ginerich--.

Signed and Sealed this

Tenth Day of October, 1995

Attest:

BRUCE LEHMAN

*Attesting Officer*     Commissioner of Patents and Trademarks

UNITED STATES PATENT AND TRADEMARK OFFICE
CERTIFICATE OF CORRECTION

PATENT NO. : 5,327,852
DATED : July 12, 1994
INVENTOR(S) : Jerry L. Gingerich

It is certified that error appears in the above-indentified patent and that said Letters Patent is hereby corrected as shown below:

On the Title page Item [76] Inventor:

Change the spelling of the Inventor's name from "Gingrich" to --Gingerich

This certificate supersedes Certificate of Correction issued October 10, 1995.

Signed and Sealed this

Twenty-third Day of April, 1996

Attest:

BRUCE LEHMAN

*Attesting Officer*  *Commissioner of Patents and Trademarks*